United States Patent
Sergison

(10) Patent No.: US 11,746,927 B2
(45) Date of Patent: Sep. 5, 2023

(54) PIVOTING TOWER FOR A HOSE MANAGEMENT SYSTEM

(71) Applicant: Caterpillar Inc., Peoria, IL (US)

(72) Inventor: Daniel P. Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 400 days.

(21) Appl. No.: 17/085,523

(22) Filed: Oct. 30, 2020

(65) Prior Publication Data

US 2022/0136619 A1 May 5, 2022

(51) Int. Cl.
| | |
|---|---|
| *B66C 23/00* | (2006.01) |
| *F16L 3/015* | (2006.01) |
| *B28B 1/00* | (2006.01) |
| *F16L 3/26* | (2006.01) |
| *B33Y 40/00* | (2020.01) |

(52) U.S. Cl.
CPC .............. *F16L 3/015* (2013.01); *B28B 1/001* (2013.01); *F16L 3/26* (2013.01); *B33Y 40/00* (2014.12)

(58) Field of Classification Search
None
See application file for complete search history.

(56) References Cited

U.S. PATENT DOCUMENTS

| | | | | |
|---|---|---|---|---|
| 3,938,670 | A * | 2/1976 | Wellman | B66C 23/34 |
| | | | | 212/297 |
| 5,979,947 | A | 11/1999 | Bushouse | |
| 6,065,621 | A * | 5/2000 | Fatemi | B66C 23/48 |
| | | | | 212/301 |
| 6,193,218 | B1 * | 2/2001 | Philyaw | H02G 1/08 |
| | | | | 254/326 |
| 6,220,292 | B1 * | 4/2001 | Woodling | B66C 23/42 |
| | | | | 137/355.16 |
| 6,533,045 | B1 | 3/2003 | Cooper | |
| 8,046,959 | B2 | 11/2011 | Stoetzer et al. | |
| 8,397,833 | B2 | 3/2013 | Stoetzer et al. | |
| 9,140,066 | B2 | 9/2015 | Lanzl et al. | |
| 2016/0167933 | A1 * | 6/2016 | Birch | B66C 23/44 |
| | | | | 254/326 |
| 2018/0216413 | A1 * | 8/2018 | Fossheim | E21B 19/22 |
| 2019/0292804 | A1 * | 9/2019 | Kensinger | E04H 12/10 |
| 2019/0368218 | A1 * | 12/2019 | Shaske | B66C 23/701 |
| 2022/0297990 | A1 * | 9/2022 | Fox | B66D 1/12 |

\* cited by examiner

*Primary Examiner* — Steven M Marsh
(74) *Attorney, Agent, or Firm* — von Briesen & Roper, s.c.

(57) ABSTRACT

An additive manufacturing system includes a base having a substantially planar surface, a plurality of support legs to support the hose management system on a ground surface such that the base is substantially parallel to the ground surface, a tower, a pivot connection point disposed on the base, the pivot connection point configured to pivotably attach to a proximal end of the tower, a winch attached to the base, and a winch cable configured to be attached between the winch and the tower. Activation of the winch applies a tension to the winch cable to cause the tower to pivot from a prone position to an upright position.

12 Claims, 8 Drawing Sheets

US 11,746,927 B2

PIVOTING TOWER FOR A HOSE MANAGEMENT SYSTEM

TECHNICAL FIELD

The present disclosure generally relates to an additive manufacturing system, and more particularly, to a hose management system for an additive manufacturing, or structural three dimensional printing, system.

BACKGROUND

Three-dimensional (3-D) printing (also known as additive manufacturing or rapid prototyping) allows for the production of three-dimensional objects by building up of a material on a layer-by-layer basis. One common 3-D printer employs a printhead extruding material that is movable in three Cartesian axes (x, y, z) with respect to a print surface. Under the control of a computer, the printhead moves through a series of positions over the printing surface and at each location deposits a small volume of material to define a portion of the printed object at that location. After a base layer is printed directly on the printing surface, the printhead is successively elevated (e.g., raised in the z-axis) to print additional layers on top of the base layer and then each succeeding layer until the object is printed.

In the context of some additive manufacturing systems, a 3-D printer may be utilized to build walls or a structure. In such an embodiment, the printhead may deposit building material, such as concrete, to build the structure. The concrete may be supplied from a source to the printhead via a hose supported by a hose management system. The hose management system may include an elevated boom supported by a tower. However, the aspects of the hose management system to convey the building material are often heavy and difficult to handle. Existing solutions require use of a crane, a fork lift, or other heavy machinery to install the boom.

U.S. Pat. No. 9,140,066 discloses a construction work unit and a method for erecting a mast. The '066 patent discloses a drilling unit, with a carrier vehicle, having a mast rotatably mounted on the carrier vehicle about a pivot axis. The mast can be pivoted between an erect operating position and an inclined transport position. It includes at least one erection cylinder for pivoting the mast between the operating position and the transport position. For pivoting the mast in addition to the at least one erection cylinder, an erection cable is provided which is guided via a cable deflection pulley arranged on the mast. A pulling force is applied to the erection cable via the cable deflection pulley such than an erection force is transferred to the mast in the direction of the operating position.

While arguably effective for its intended purpose, there is still need for improved systems and methods for assembling a hose management system for an additive manufacturing system.

SUMMARY

In one embodiment, a hose management system for an additive manufacturing system includes a base having a substantially planar surface, a plurality of support legs to support the hose management system on a ground surface such that the base is substantially parallel to the ground surface, a tower, a pivot connection point disposed on the base, the pivot connection point configured to pivotably attach to a proximal end of the tower, a winch attached to a winch support post extending from the base, and a winch cable configured to be attached between the winch and the tower. Activation of the winch applies a tension to the winch cable to cause the tower to pivot from a prone position to an upright position.

Another embodiment discloses a method that includes supporting a base of the hose management system such that a substantially planar surface of the base is substantially parallel to a ground surface, filling a ballast tank supported by the base, attaching a proximal end of a tower to a pivot connection point on the base with the tower being in a prone position, attaching a cement pipe to the tower, attaching a boom to the cement pipe in proximity to a distal end of the tower when the tower is in the prone position, attaching a winch cable between a winch and the distal end of the tower, and applying a tension, via the winch, to the winch cable to pivot the tower from the prone position to an upright position.

Yet another embodiment discloses a hose management system for an additive manufacturing system. The hose management system includes a base having a substantially planar surface, a ballast tank supported on the substantially planar surface, a plurality of extensible support legs to support the hose management system on a ground surface such that the base is either one of substantially parallel to the ground surface and level to the ground surface, a tower having an upward facing bearing clamp configured to attach to a cement pipe, a boom configured to be attached to the cement pipe in proximity to a distal end of the tower, a pivot connection point disposed on the base, the pivot connection point configured to pivotably attach to a proximal end of the tower, a winch attached to a winch support post extending from the base, and a winch cable configured to be attached between the winch and the tower. Activation of the winch applies a tension to the winch cable to cause the tower to pivot from a prone position to an upright position.

These and other aspects and features of the present disclosure will be more readily understood when read in conjunction with the accompanying drawings.

DETAILED DESCRIPTION

Figure 1:
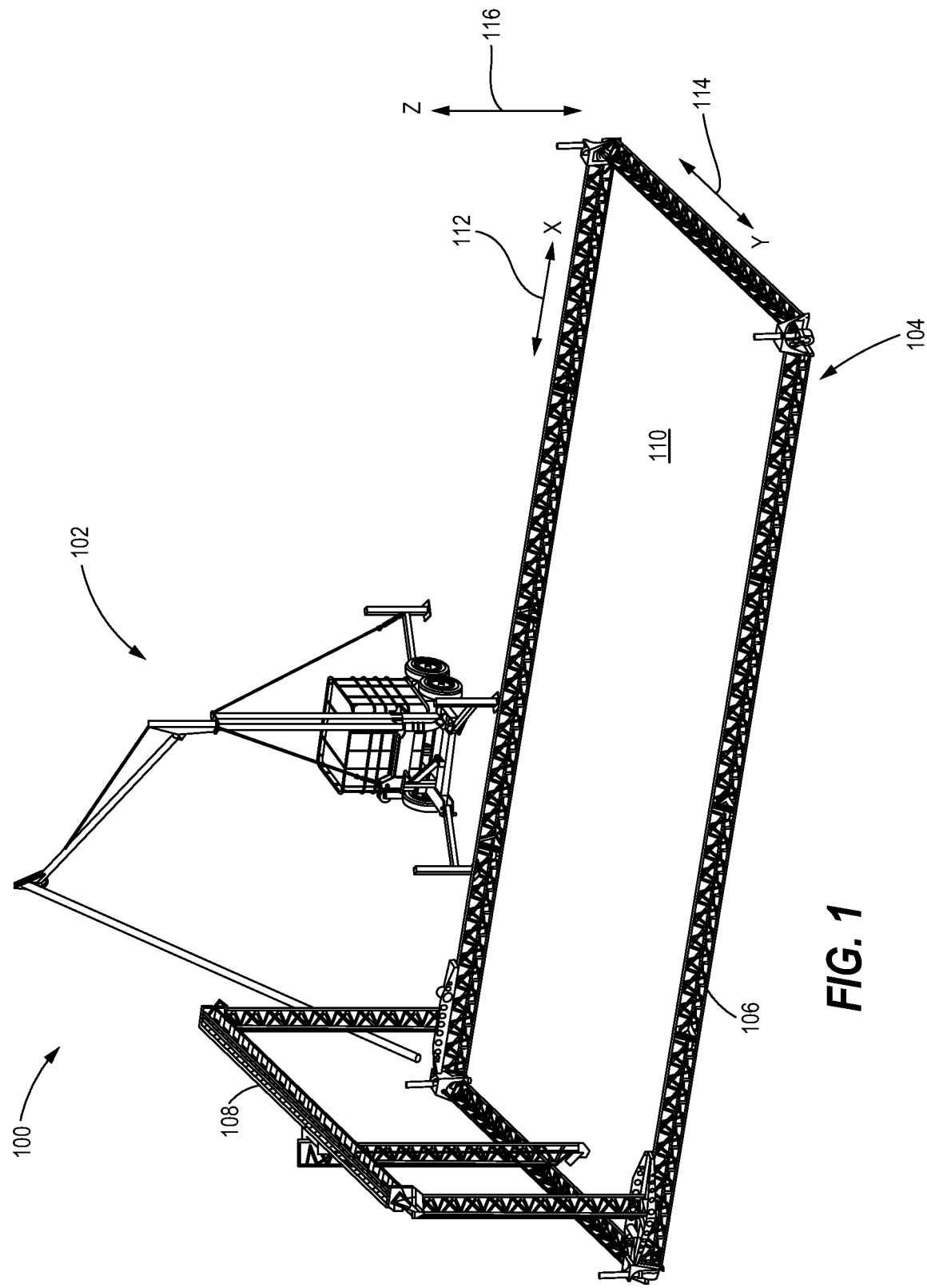
FIG. 1 is a perspective view of an additive manufacturing system having a hose management system, in accordance with an embodiment of the present invention.

Referring to figures, FIG. 1 depicts a perspective view of an additive manufacturing system having a hose management system, in accordance with an embodiment of the present invention. In particular, FIG. 1 depicts the perspective view 100 that includes the hose management system 102 and the additive manufacturing system 104. Further details of the hose management system 102 will be discussed below. The additive manufacturing system 104 includes a gantry frame 106 that rests on the ground surface 110 and a gantry bridge 108 that extends upwards from the ground surface 110.

The gantry frame 106 is generally rectangular in shape as depicted in FIG. 1, although other shapes may be used. The gantry frame 106 generally extends left to right along the x-axis 112 and top to bottom along the y-axis 114 as depicted in FIG. 1. The gantry bridge is also generally rectangular in shape and extends along upwards along the z-axis 116 and across along the y-axis 114.

The additive management system may be used to print, or construct, via three dimensional (3D) printing various structural components such as walls, enclosures, foundations, and the like. The additive manufacturing system 104 is a portable system and is able to be moved from place to place to support constructing various different shelters, enclosures, and structures. In general, the structures are constructed within the confines of the gantry frame 106 and underneath the height of the gantry bridge 108. Other aspects of the additive manufacturing system 104 that are not depicted herein include controls and devices to position the print head (e.g., the end of a hose supported by the hose management system 102) in various positions to construct the structure. The hose management system 102 includes the various aspects of the tower, boom, and stick that support repositioning of the hose which conveys the structural material from a source to the print head. The structural material may include cement, or other similar building materials. The structural material may be added in planes that extend along the x-axis 112 and the y-axis 114 at a given height along the z-axis 116. Subsequent layers may be added in additional x-y planes at higher heights along the z-axis 116 to effect 3D printing of the structure.

Figure 2:
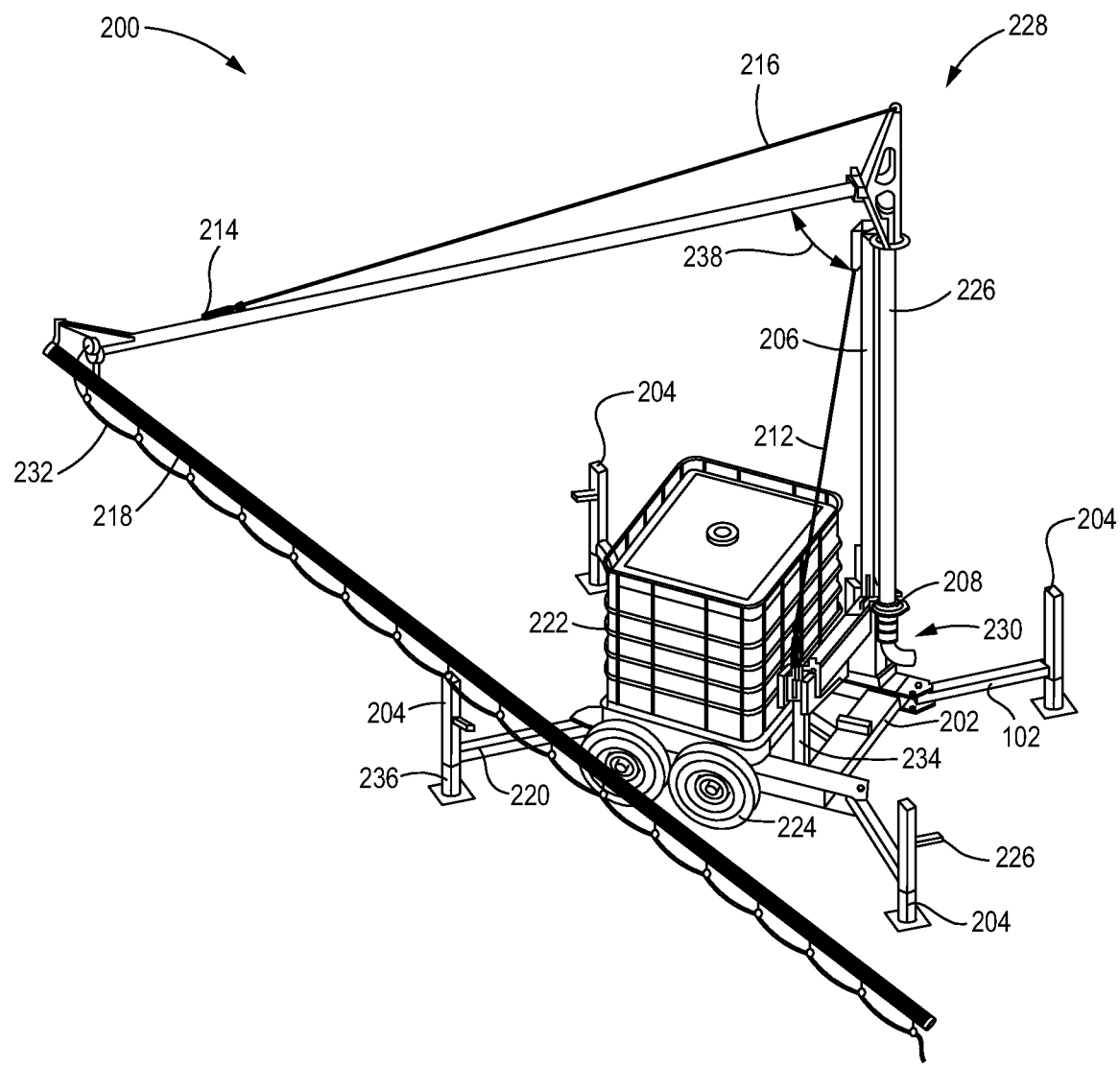
FIG. 2 is a perspective view of a hose management system, in accordance with an embodiment of the present invention.

FIG. 2 is a perspective view of a hose management system, in accordance with an embodiment of the present invention. In particular, FIG. 2 depicts the perspective view 200 that shows the hose management system 102 of FIG. 1 in more detail. The hose management system 102 includes a base 202 having a substantially planar surface. The base 202 may support a ballast tank 222 configured to be filled with ballast, such as water, sand, and the like. The ballast tank 222 may be realized by a light-weight plastic container that is easily transportable when empty. The ballast tank 222 may include an ingress for filling and a separate egress for emptying the ballast tank 222. In some embodiments, the ballast tank 222 has a capacity of approximately 150 to 250 gallons, although certainly other sizes of the ballast tank 222 may be considered.

A plurality of support legs 204 support the base 202 of the hose management system 102. The support legs 204 may be extensible support legs that extend outward from the base 202 via outriggers 220.

At least one of the support legs in the plurality of support legs 204 may include a leveling jack 236 that is configured to adjust the height of the base 202 relative to the ground surface 110. The leveling jack 236 may be positioned by hand, repositioned via an electric linear actuator, or other similar methods.

The substantially planar surface of the base 202 may be positioned to be level to the ground surface 110. In other embodiments, the substantially planar surface of the base 202 may be positioned to be parallel to the ground surface 110. Positioning of the hose management system 102 may be performed in part by operating the leveling jack 236 of the support legs 204.

The support legs 204 may be positioned such that the ground engaging members 224, used to transport the hose management system 102 when not in use, are lifted off of the ground surface 110.

Thus, the hose management system 102 provides for a wide support base that is anchored down with a filled ballast tank 222. Such aspects resist overturning of the hose management system 102 when conveying the structural material via a hose over an extended boom and stick.

The hose management system 102 further includes a tower 206 having a distal end 228 and a proximal end 230. A pivot connection point 208 disposed on the base 202 is configured to be pivotably attached to the proximal end 230 of the tower 206.

Also depicted in FIG. 2 is a cement pipe 226. The cement pipe 226 is configured to be attached to the tower 206. The cement pipe 226 includes an internal cavity through which the structural material flows when 3D printing. When attached to the tower 206 and in an upright position, the cement pipe 226 may rotate freely about the z-axis 116.

Extending away from the cement pipe 226 and the tower 206 is a boom 214. The boom 214 may also include an internal cavity through which the structural material flows when 3D printing. Thus, the internal cavity of the boom 214 may be fluidly connected to the cement pipe 226.

A stick 218 is attached to the boom 214 at the opposite end of the boom 214 as the tower 206. The stick 218 is configured to support a hose 232. The hose 232 may be fluidly connected to the internal cavity of the boom 214 to convey the structural material when 3D printing. A boom guy 216 may be attached to the boom 214 to permit changing a boom angle 238 of the boom 214 relative to the tower 206.

A winch 210 is attached a winch support post 234 that extends upward from the base 202. In various embodiments, the winch 210 may be one of a hand-powered winch (e.g., a hand crank), an electric-powered winch, a hydraulic-powered winch, or a pneumatic-powered winch.

A winch cable 212 is configured to be attached between the winch 210 and the tower 206. The winch cable 212 may be routed from the winch 210, through a pulley 304 attached to a pulley connection point 306 that is disposed at the distal end 228 of the tower 206, and back towards the winch cable connection point 308 that is disposed in proximity to the proximal end 230 of the tower 206. The winch cable connection point 308 being disposed in proximity to the proximal end 230 of the tower 206 permits a user to reach the winch cable connection point 308 without the use of a ladder, or other such device, when the tower 206 is in an upright position. The winch cable 212 may then be used for other purposes after the tower 206 is pivoted to the upright position. Activation of the winch 210 applies a tension to the winch cable 212 to cause the tower 206 to pivot from a prone position to an upright position about the pivot connection point 208.

Figure 3:
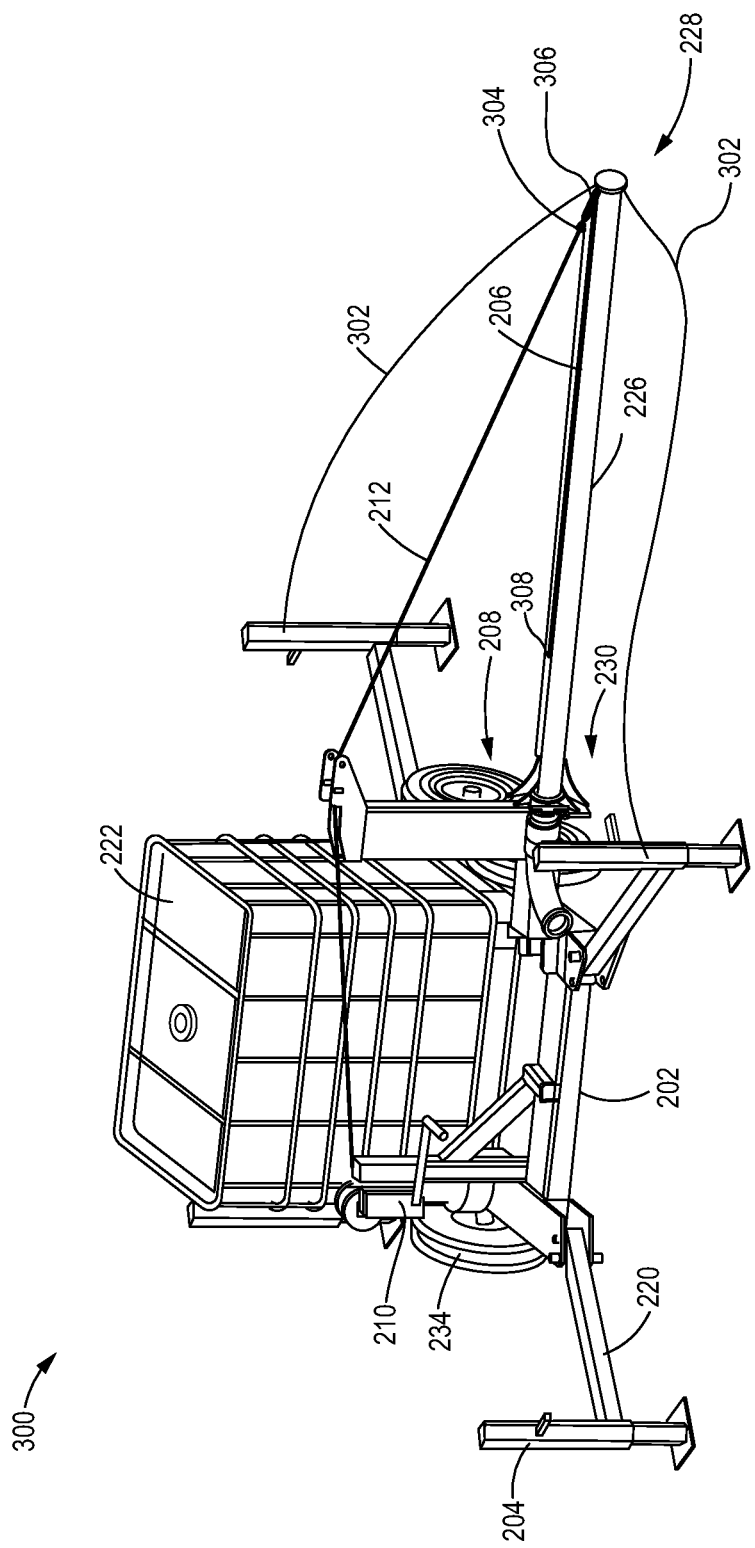
FIG. 3 is a perspective view of a hose management system with a tower in a prone position, in accordance with an embodiment of the present invention.

FIG. 3 is a perspective view of a hose management system with a tower in a prone position, in accordance with an embodiment of the present invention. In particular, FIG. 3 depicts the hose management system 102 with the tower 206 in a prone position. As depicted in FIG. 3, the base 202 of the hose management system 102 is supported on the ground surface 110 via the support legs 204. The ballast tank 222 is supported on the base 202 and is filled with ballast material.

The cement pipe 226 is attached to the tower 206. The proximal end 230 of the tower 206 is attached to the pivot connection point 208. Further, a winch cable 212 extends between the winch 210 and the distal end 228 of the tower.

Also depicted in FIG. 3 are a plurality of guy wires 302. A first end of the guy wires may be attached to the distal end 228 of the tower 206. A second end of the plurality of guy wires may be attached to various guy-wire attachment points spread about the hose management system 102. The guy wires provide for additional support for the tower 206 when it is in the upright position. When in the prone position depicted in FIG. 3, the tower 206 is ready to be raised to an upright position. Activation of the winch 210 causes a tension to be applied to the winch cable 212. This tension causes the tower 206 to pivot about the pivot connection point 208 to raise the tower 206 from the prone position to an upright position.

In some embodiments, the winch cable is routed from the pulley connection point 306, through the pulley 304, and to a supplemental lifting device. The supplemental lifting device may be a winch separate from the winch 210 of the hose management system 102, a hydraulic winch or cylinder, a gear rack, or the like. The supplemental lifting device is thus used in place of the winch 210.

Figure 4:
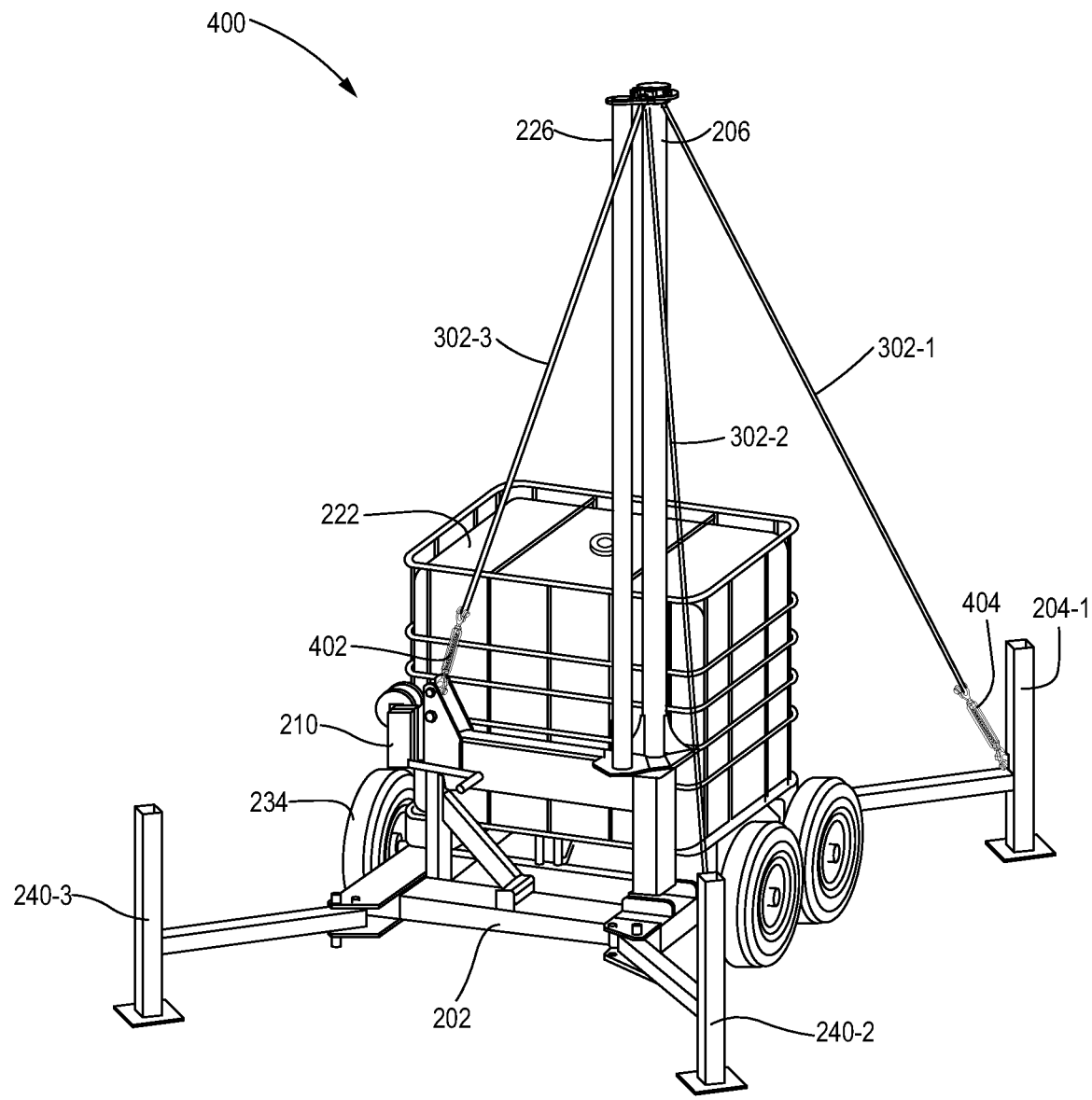
FIG. 4 is a perspective view of a hose management system with a tower in an upright position, in accordance with an embodiment of the present invention.

FIG. 4 is a perspective view of a hose management system with a tower in an upright position, in accordance with an embodiment of the present invention. In particular, FIG. 4 depicts the perspective view 400 of the hose management system 102 with a tower in an upright position. Here, the winch 210 has been activated, and the tower 206, attached to the cement pipe 226, have been raised to the upright position.

The guy wires 302 may be attached to various guy-wire-attachment points of the hose management system 102. In one example, a first guy wire 302-1 extends between the distal end 228 of the tower 206 and a first extensible support leg 204-1, a second guy wire 302-2 extends between the distal end 228 of the tower 206 and a second extensible support leg 204-2, and a third guy wire 302-3 extends between the distal end 228 of the tower 206 and the winch support post 234. The guy wires may further include a turnbuckle 404 to adjust the tension on the guy wires 302.

In other embodiments, the guy wires may extend from the distal end 228 of the tower 206 to other guy-wire-attachment points. For example, they may extend to support legs that are not extended, to three different support legs, various locations about the base 202, and the like.

Figure 5:
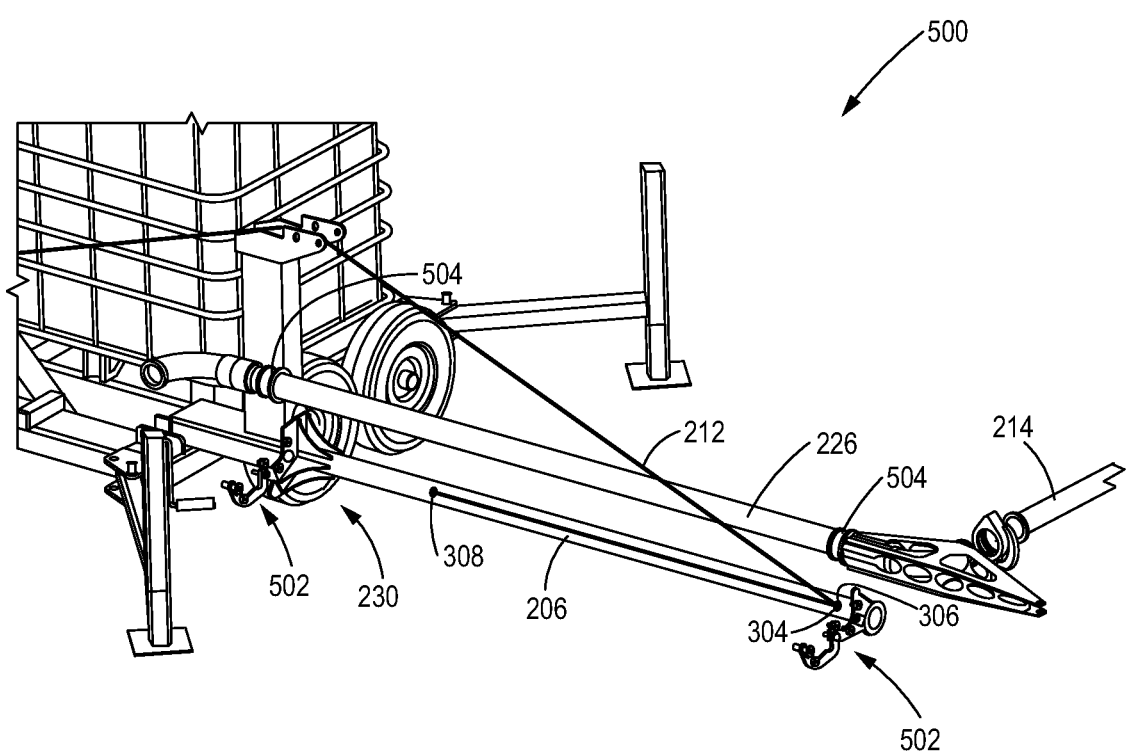
FIG. 5 is a perspective view of a cement pipe unattached from the tower, in accordance with an embodiment of the present invention.

FIG. 5 is a perspective view of a cement pipe unattached from the tower, in accordance with an embodiment of the present invention. In particular, FIG. 5 depicts the perspective view 500 that depicts the cement pipe 226 unattached from the tower 206. In some embodiments, the tower 206 is equipped with bearing clamps 502 at its distal end 228 and its proximal end 230. The bearing clamps 502 may be operated without tools or machinery (e.g., by hand) to attach the cement pipe 226 to the tower 206. The bearing clamps 502 permit the attached cement pipe 226 to rotate within the bearing clamps 502.

The cement pipe 226 may include a race 504 configured to engage with the bearing clamps 502. Multiple races 504 may be positioned on the cement pipe 226. These races 504 may be spaced apart along the cement pipe 226 at a distance equal to that of a spacing between the bearing clamps 502 along the tower 206. The races 504 permit rotation of the cement pipe 226 while preventing axial movement of the cement pipe 226.

Figure 6:
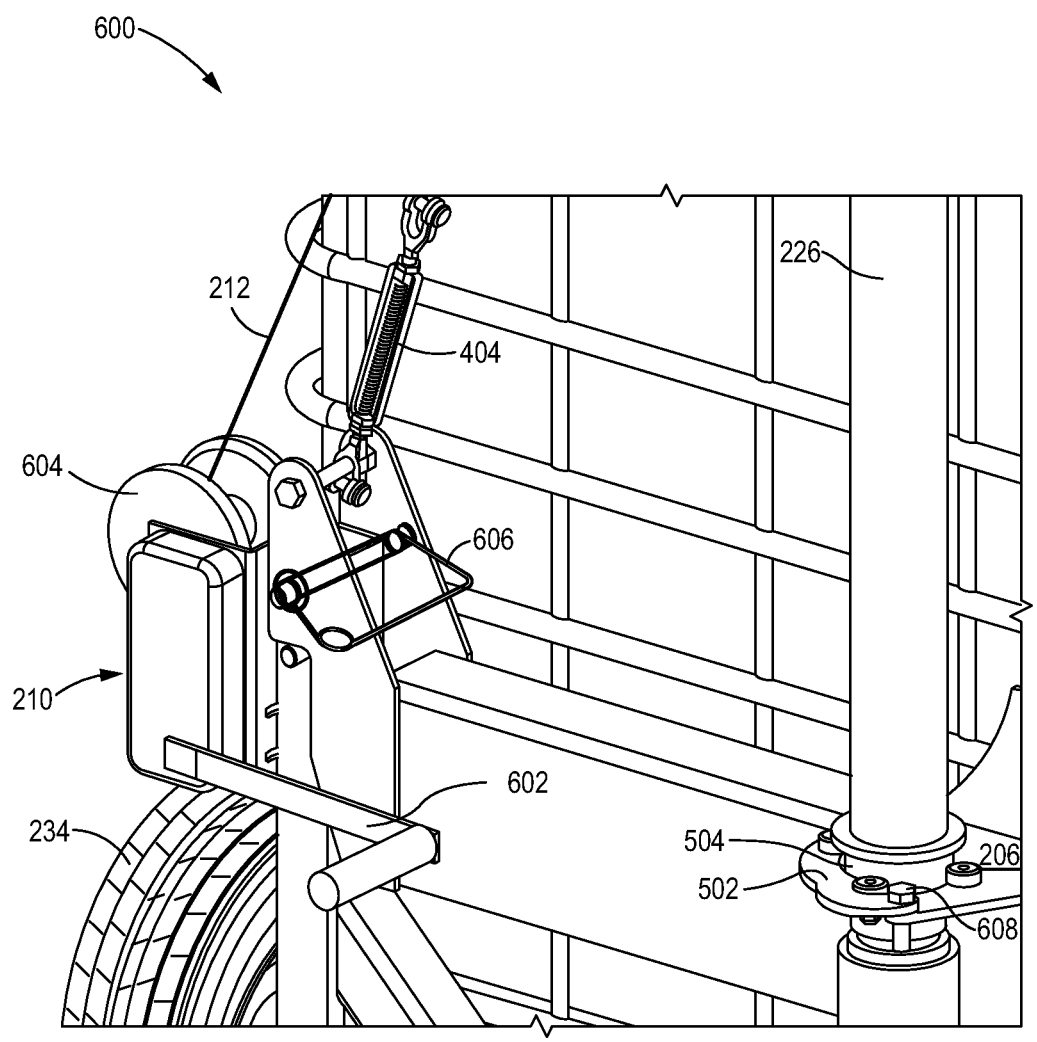
FIG. 6 is a perspective view of a winch, in accordance with an embodiment of the present invention.

FIG. 6 is a perspective view of a winch, in accordance with an embodiment of the present invention. In particular, FIG. 6 depicts the perspective view 600 that includes the winch 210 that is attached to the winch support post 234. In some embodiments, the winch 210 includes a hand crank 602 that is operatively coupled to a spool 604 by way of gears, ratcheting features, and the like. Operation of the hand crank 602 rotates the spool 604 to adjust the tension of the winch cable 212. FIG. 6 further depicts the pivot locking pin 606 that may be inserted after the tower 206 is in an upright position to prevent the tower 206 from pivoting.

FIG. 6 also depicts the cement pipe 226 in an upright position and its race 504 attached to the bearing clamp 502 of the tower 206. A bolt 608 may be placed within the bearing clamp 502 to secure the bearing clamp 502 to the race 504 of the cement pipe 226.

Figure 7:
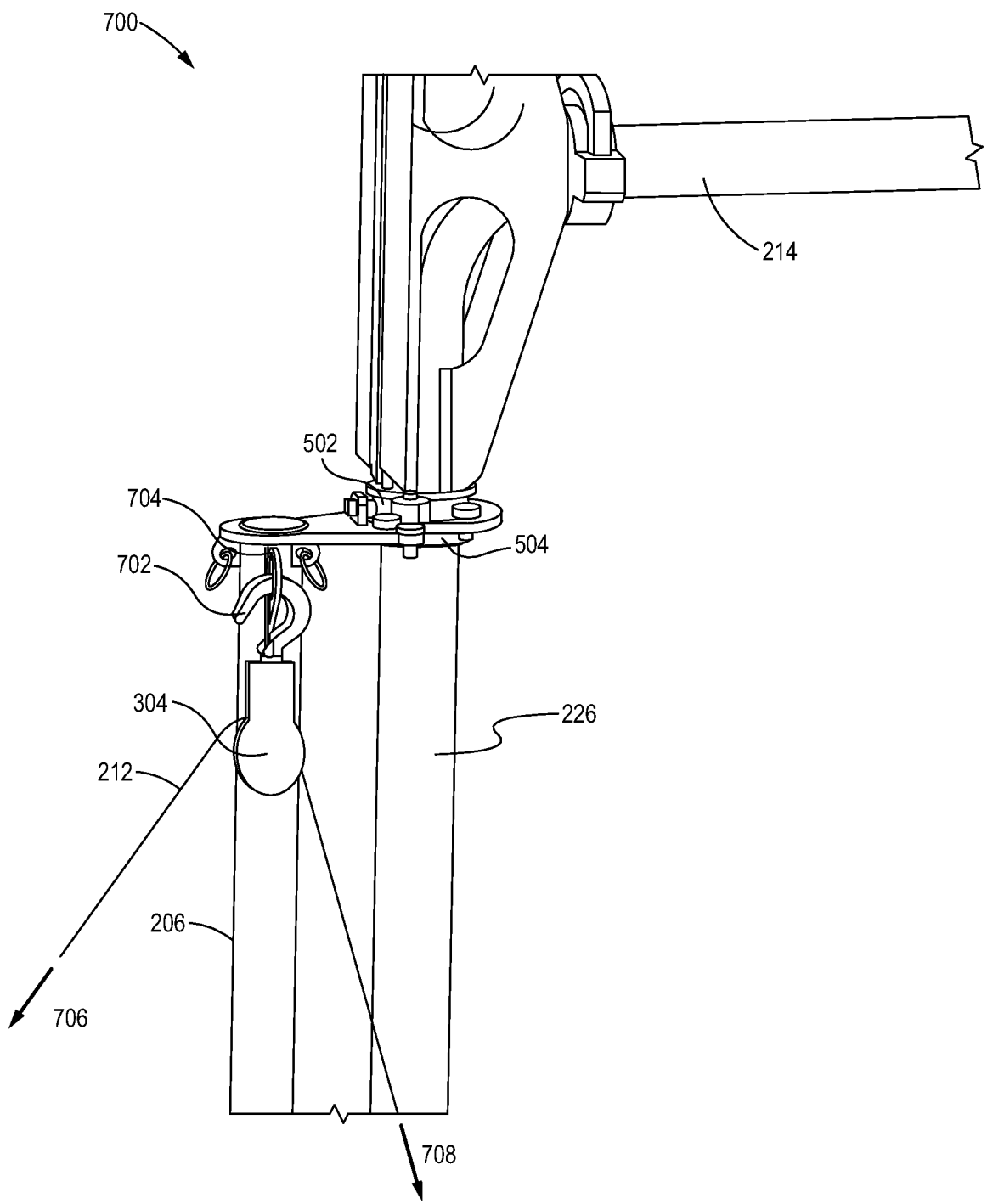
FIG. 7 is a perspective view of a distal end of a tower, in accordance with an embodiment of the present invention.

FIG. 7 is a perspective view of a distal end of a tower, in accordance with an embodiment of the present invention. In particular, FIG. 7 depicts the perspective view 700 showing, in general, the distal end 228 of the tower 206. At the distal end 228 of the tower 206, the bearing clamp 502 is attached to the race 504 of the cement pipe 226. The boom 214 is attached to the cement pipe 226 as well. The pulley 304 is attached to the distal end 228 of the tower 206 at its pulley connection point 306. Here, the pulley connection point 306 is realized by a book 702 being inserted through an eyelet 704. However, other variations of the pulley connection point 306 may exist. A first end 706 of the winch cable 212 is attached to the winch 210. A second end 708 of the winch cable 212 is attached to the winch cable connection point 308.

INDUSTRIAL APPLICABILITY

In general, the teachings of the present disclosure may find applicability in many other similar applications with use of towers, booms, and sticks. For instance, the teachings of the present disclosure may be applicable to other three dimensional printing machines, mining machines, and the like.

Figure 8:
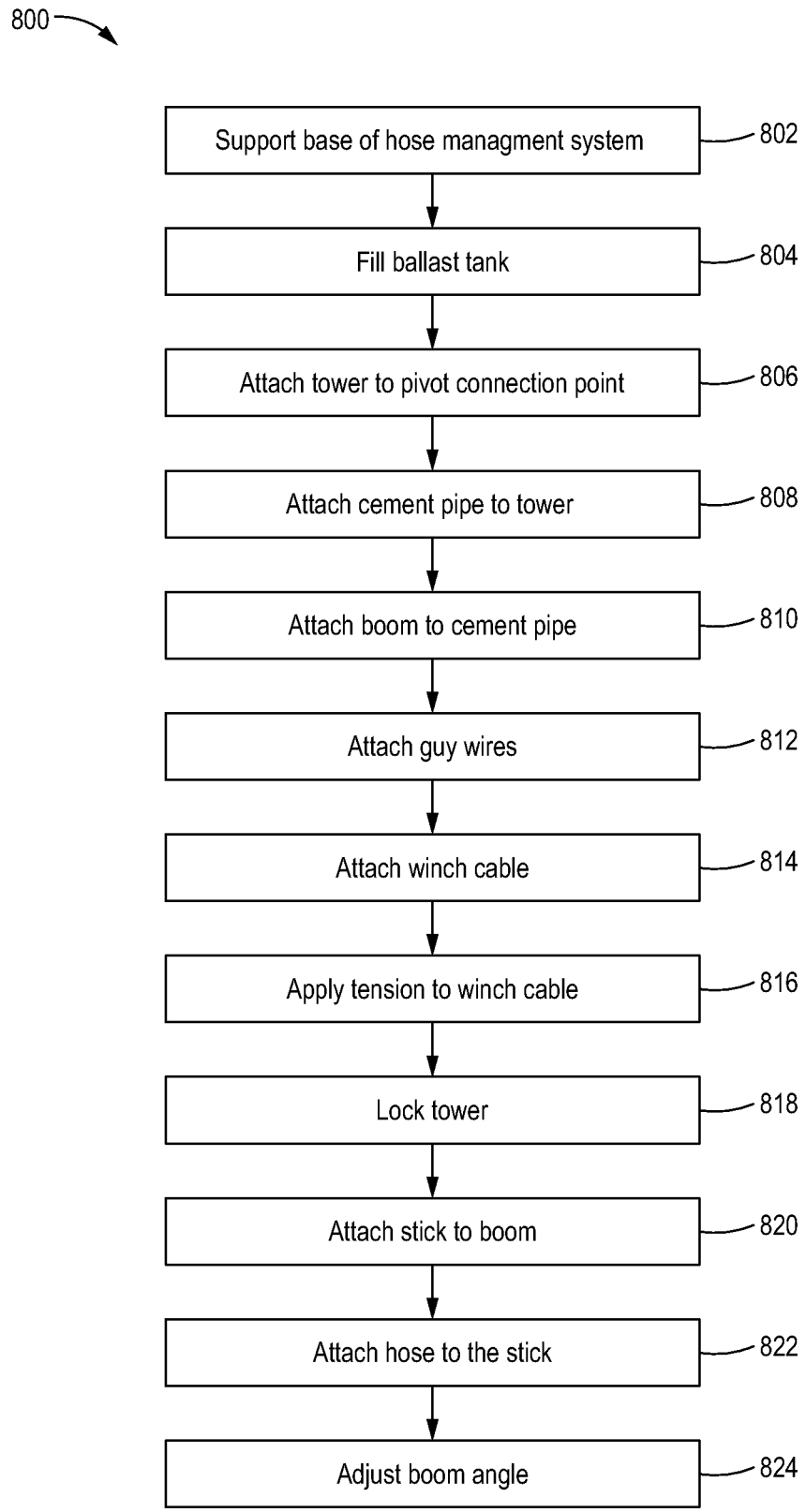
FIG. 8 is a flow chart depicting a method of additive manufacturing, in accordance with an embodiment of the present invention.

In various systems, a tower and boom may need to be frequently raised and lowered. For example, when building multiple different structures, the hose management system may need to be relocated to different places to support building a new structure. Further, during construction of a single structure, it may be required to lower the tower from the upright position to a prone position to facilitate maintenance on the machine. For example, the cement pipe, boom, and hose may become clogged, requiring cleaning and other maintenance on these components. As such, it is desired to have a hose management system and methods to permit raising and lowering of the tower and boom as necessary. As such, FIG. 8 depicts a flow chart of a method of additive manufacturing, in accordance with an embodiment of the present invention. The method 800 of FIG. 8 will be used in conjunction with the preceding FIGS. 1-7 to demonstrate an exemplary method.

The method 800 is a method of assembling a hose management system 102 of an additive manufacturing system 104. The method 800 includes supporting a base 202 of the hose management system 102 at block 802, filling a ballast tank 222 at block 804, attaching a tower 206 to a pivot connection point 208 at block 806, attaching a cement pipe 226 to the tower 206 at block 808, attaching a boom 214 to the cement pipe 226 at block 810, attaching guy wires 302 at block 812, attaching a winch cable 312 at block 814, applying tension to the winch cable 312 at block 816, locking the tower at block 818, attaching a stick 218 to the boom 214 at block 820, attaching a hose 232 to the stick 218 at block 822, and adjusting the boom angle 238 at block 824.

At block 802, the base 202 of the hose management system 102 is supported. The base 202 includes a substantially planar surface, and it may be supported such that it is substantially parallel or level to the ground surface 110. The base 202 may be supported by the support legs 204, which may be extended outward from the base by way of the outriggers 220. A leveling jack 236 of a support leg 204 may be operated to adjust the height of the base 202 relative to the ground surface 110.

At block 804, the ballast tank 222, supported by the base 202, is filled. The ballast tank 222 may be filled with sand, water, or other available material.

At block 806, a proximal end 230 of the tower 206 is attached to the pivot connection point 208. The tower 206 is situated in a prone position (e.g., is laying on the ground surface 110).

At block 808, the cement pipe 226 is attached to the tower 206. Attaching the cement pipe 226 to the tower 206 may comprise attaching the cement pipe 226 via the bearing clamps 502. Operation of the bearing clamps 502 may be performed by hand without the use of additional tools or machinery.

At block 810, a boom 214 is attached to the cement pipe 226 in proximity to the distal end 228 of the tower 206. The boom 214 is attached to the cement pipe 226 when the tower 206 is in a prone position.

At block 812, guy wires are attached. A first end of the plurality of guy wires is attached to the distal end 228 of the tower 206 when the tower is in the prone position. The second ends of the guy wires are attached to the a plurality of guy-wire-attachment points when the tower is in the upright position. The guy wires 302 may further include turnbuckles 404 to permit adjusting the tension on the guy wires 302.

At block 814, the winch cable 212 is attached between the winch 210 and the distal end 228 of the tower 206. At block 816, a tension is applied, via the winch 210, to the winch cable 212. The tension causes the tower 206 to pivot about the pivot connection point 208 from a prone position to an upright position.

At block 818, the tower 206 is locked in the upright position via a locking mechanism configured to prevent the tower 206 from pivoting from the upright position to the prone position. Such locking mechanism may be a function of the winch 210, or be a separate locking mechanism applied to the tower 206.

At block 820, the stick 218 is attached to the boom 214. The stick 218 may be attached to the boom 214 when the tower 206 is in the prone position. Alternatively, the stick 218 may be attached to the boom 214 when the tower 206 is in the upright position by way of adjusting the boom angle 238. For example, the boom 214 may be lowered via the boom guy 216. When the boom 214 is lowered, the stick 218 may be attached to the boom 214.

At block 822, a hose 232 is attached to the stick 218. The hose 232 may also be fluidly connected to the boom 214. Similar to attaching the stick 218 to the boom 214, the hose 232 may be attached to the stick 218 when the tower 206 is in the upright position and the boom 214 is lowered (e.g., block 824).

The various blocks listed herein may be rearranged, or various steps omitted, as known by those with skill in the art. For example, the steps listed above may be reversed to lower the tower 206 from the upright position to the prone position. Further, not all steps may be necessary. For example, at block 804, the ballast tank 222 may not need to be filled if already filled and the tower 206 is being raised and lowered for periodic maintenance.

Further, the hose management system 102 may also be used for various other lifting tasks. For example, the hose management system 102 may be used to lift the gantry bridge 108 of the additive manufacturing system 104. In such an embodiment, the tower 206 is raised to the upright position, and the winch cable 212 may be disconnected from the winch cable connection point 308 and is subsequently attached between the winch 210 and the gantry bridge 108. Tension is applied to the winch cable 212 by activation of the winch 210. Thus, the winch cable 212 may be used to lift the gantry bridge 108 in place along the gantry frame 106. The winch cable connection point 308 is disposed in proximity to the proximal end 230 of the tower 206. As such, the winch cable connection point 308 is disposed at a height that is generally accessible to workers without the need to utilize a ladder, or other device. In some embodiments, the winch cable 212 is routed from the gantry bridge 108, through the pulley 304, and to a supplemental lifting device. The supplemental lifting device may be a winch separate from the winch 210 of the hose management system 102, a hydraulic winch or cylinder, a gear rack, or the like. The supplemental lifting device is thus used in place of the winch 210.

What is claimed is:

1. A hose management system for an additive manufacturing system, the hose management system comprising:
    a base having a substantially planar surface;
    a plurality of support legs to support the hose management system on a ground surface such that the base is substantially parallel to the ground surface;
    a tower;
    a pivot connection point disposed on the base, the pivot connection point configured to pivotably attach to a proximal end of the tower;
    a winch attached to a winch support post extending from the base; and
    a winch cable configured to be attached between the winch and the tower, wherein activation of the winch applies a tension to the winch cable to cause the tower to pivot from a prone position to an upright position.

2. The hose management system of claim 1, further comprising a ballast tank supported by the base.

3. The hose management system of claim 1, wherein at least one support leg in the plurality of support legs comprises a leveling jack configured to adjust a height of the base relative to the ground surface.

4. The hose management system of claim 1, wherein the plurality of support legs comprise extensible support legs that extend away from the base via an outrigger.

5. The hose management system of claim 4, further comprising:
    a first guy wire configured to extend between a distal end of the tower and a first extensible support leg of the plurality of support legs;
    a second guy wire configured to extend between the distal end of the tower and a second extensible support leg of the plurality of support legs; and
    a third guy wire configured to extend between the distal end of the tower and the winch.

6. The hose management system of claim 1, further comprising a pulley attached to a distal end of the tower, wherein the winch cable is routed from the winch, through the pulley, and to a winch cable connection point disposed in proximity to the proximal end of the tower.

7. The hose management system of claim 1, wherein the winch is powered by a hand crank.

8. The hose management system of claim 1, wherein the winch is one of an electric-powered winch, a hydraulic-powered winch, and a pneumatic-powered winch.

9. The hose management system of claim 1, further comprising a cement pipe configured to be attached to the tower and a boom configured to be attached to the cement pipe in proximity to a distal end of the tower.

10. The hose management system of claim 9, wherein the tower attaches to the cement pipe via an upward facing bearing clamp.

11. The hose management system of claim 9, further comprising a stick configured to be attached to the boom, the stick configured to support a hose.

12. A hose management system for an additive manufacturing system, the hose management system comprising:
   a base having a substantially planar surface;
   a ballast tank supported on the substantially planar surface;
   a plurality of extensible support legs to support the hose management system on a ground surface such that the base is either one of substantially parallel to the ground surface and level to the ground surface;
   a tower having an upward facing bearing clamp configured to attach to a cement pipe;
   a boom configured to be attached to the cement pipe in proximity to a distal end of the tower;
   a pivot connection point disposed on the base, the pivot connection point configured to pivotably attach to a proximal end of the tower,
   a winch attached to a winch support post extending from the base; and
   a winch cable configured to be routed through a pulley at the distal end of the tower and to be attached between the winch and a winch cable connection point disposed in proximity to the proximal end of the tower, wherein activation of the winch applies a tension to the winch cable to cause the tower to pivot from a prone position to an upright position.

* * * * *